US008529392B1

(12) United States Patent
Samie et al.

(10) Patent No.: US 8,529,392 B1
(45) Date of Patent: Sep. 10, 2013

(54) TRANSMISSION WITH DOUBLE-SUN, ANNULAR GEAR, AND OUTER GEAR COPLANAR GEAR SET

(71) Applicant: GM Global Technology Operations LLC, Detroit, MI (US)

(72) Inventors: Farzad Samie, Franklin, MI (US); Kumaraswamy V. Hebbale, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/744,720

(22) Filed: Jan. 18, 2013

Related U.S. Application Data

(60) Provisional application No. 61/606,125, filed on Mar. 2, 2012.

(51) Int. Cl.
  *F16H 1/32* (2006.01)
(52) U.S. Cl.
  USPC .......................................................... 475/177

(58) Field of Classification Search
  USPC .................................................. 475/177, 180
  See application file for complete search history.

(56) References Cited

U.S. PATENT DOCUMENTS

| | | | | |
|---|---|---|---|---|
| 2,250,259 | A * | 7/1941 | Foote, Jr. ...................... | 475/177 |
| 3,534,636 | A * | 10/1970 | Lorence ........................ | 475/177 |
| 4,155,276 | A * | 5/1979 | Fengler ......................... | 475/177 |
| 7,235,030 | B2 * | 6/2007 | Becker et al. ................. | 475/177 |
| 2002/0108832 | A1 | 8/2002 | Kerr | |
| 2010/0048346 | A1 | 2/2010 | Hoffman et al. | |
| 2011/0009228 | A1 | 1/2011 | Bauknecht et al. | |
| 2011/0009229 | A1 | 1/2011 | Bauknecht et al. | |

* cited by examiner

*Primary Examiner* — Edwin A Young
(74) *Attorney, Agent, or Firm* — Quinn Law Group, PLLC

(57) ABSTRACT

A transmission includes a coplanar gear set with a first sun gear member rotatable about a first axis of rotation, a second sun gear member rotatable about the first axis of rotation, a carrier member, and an outer gear radially outward of and concentric with the first sun gear member. A first annular gear meshes with the first sun gear member, and the outer gear meshes with the first annular gear and with the second sun gear member. The first annular gear is rotatable about a second axis of rotation and the outer gear is rotatable about a third axis or rotation.

15 Claims, 2 Drawing Sheets

TRANSMISSION WITH DOUBLE-SUN, ANNULAR GEAR, AND OUTER GEAR COPLANAR GEAR SET

CROSS-REFERENCE TO RELATED APPLICATION

U.S. Provisional Application No. 61/606,125 filed on Mar. 2, 2012 is hereby incorporated by reference in its entirety.

TECHNICAL FIELD

The present teachings generally include transmissions that have a coplanar gear set.

BACKGROUND

Most passenger vehicles include a powertrain that has an engine, a multi-speed transmission, and a differential or final drive. The multi-speed transmission increases the overall operating range of the vehicle by permitting the engine to operate through its torque range a number of times. A primary focus of transmission and engine design is increasing vehicle fuel efficiency. Generally, an increased number of speed ratios provides greater fuel efficiency. However, it is challenging to package gear sets and selectively engageable torque-transmitting mechanisms to achieve the desired modes of operation while still meeting other applicable dimensional limitations and achieving relatively simple assembly requirements.

SUMMARY

A transmission is provided that has a coplanar gear set with two sun gear members, an annular gear, a common carrier member, and an outer gear. Specifically, the transmission includes a coplanar gear set having a first sun gear member rotatable about a first axis of rotation. The first sun gear member has a radially outward-facing surface defining outer teeth. The transmission has a second sun gear member rotatable about the first axis of rotation. The second sun gear member has a radially outward-facing surface defining outer teeth. The transmission has a carrier member. A first annular gear is supported by the carrier member and has a radially inward-facing surface defining inner teeth and a radially outward-facing surface defining outer teeth. The first annular gear is rotatable about a second axis of rotation that rotates about the first axis of rotation. The inner teeth of the first annular gear mesh with the outer teeth of the first sun gear member. An outer gear is supported by the carrier member and has a radially inward-facing surface defining inner teeth. The outer gear is rotatable about a third axis of rotation that rotates about the first axis of rotation. The inner teeth of the outer gear mesh with the outer teeth of the first annular gear and with the outer teeth of the second sun gear member.

By providing the coplanar gear set with another gear set that may or may not also be a coplanar gear set, axial space savings are achieved. Moreover, a coplanar gear set can achieve a wider gear set ratio range than a planetary gear set, has a high contact ratio, and has relatively quiet operation.

The above features and advantages and other features and advantages of the present invention are readily apparent from the following detailed description of the best modes for carrying out the invention when taken in connection with the accompanying drawings.

DETAILED DESCRIPTION

Figures 1, 2:
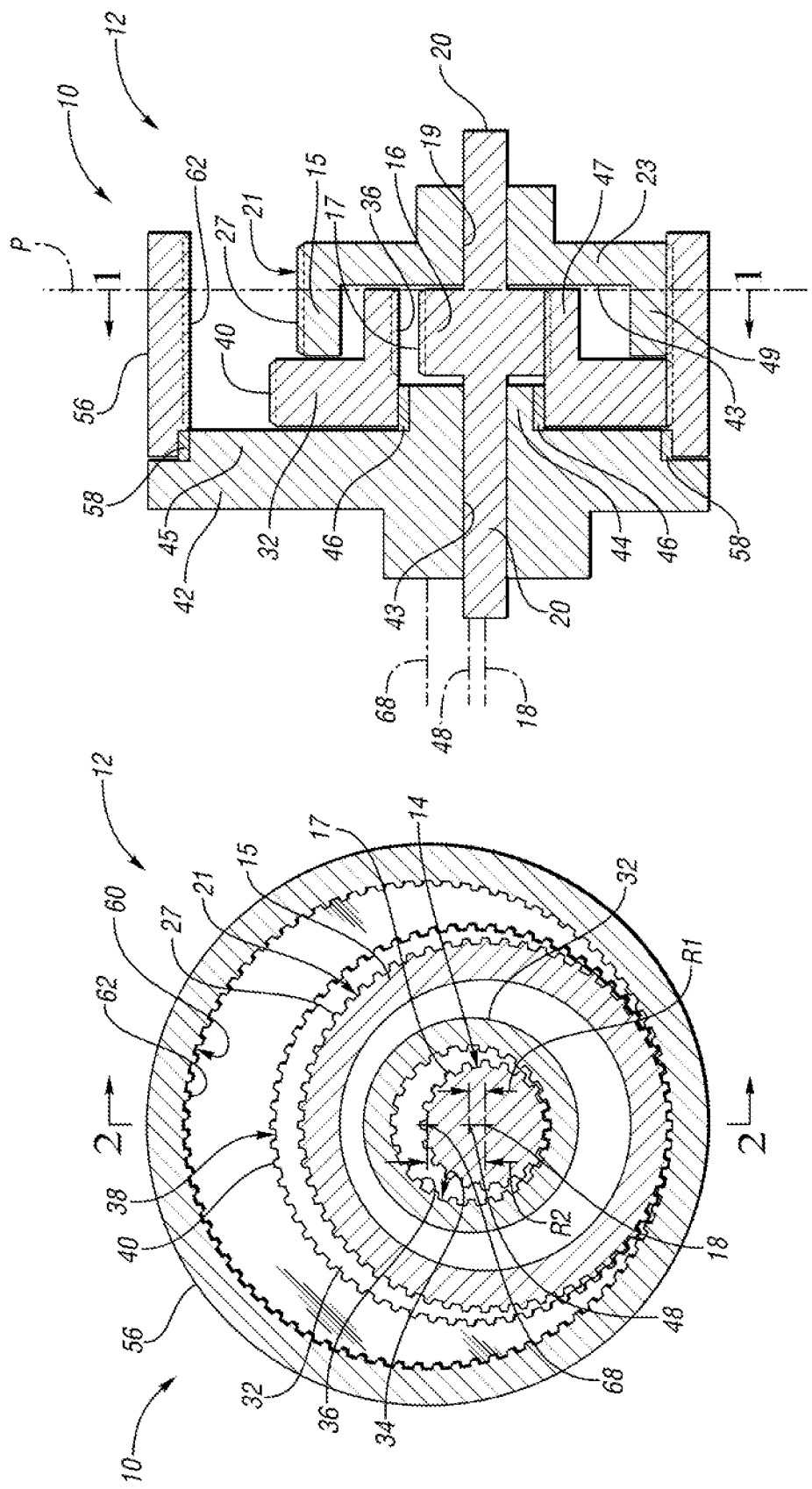
FIG. 1 is a schematic cross-sectional illustration of a portion of a first embodiment of a transmission including a coplanar gear set taken at lines 1-1 in FIG. 2.
FIG. 2 is a schematic cross-sectional illustration of the portion of the transmission of FIG. 1 taken at lines 2-2 in FIG. 1.

Referring to the drawings, wherein like reference numbers refer to like components throughout the several views, FIGS. 1 and 2 show a portion of a transmission 10 that includes a coplanar gear set 12. As used herein, a "coplanar gear set" is a gear set that includes an annular gear. As used herein, an "annular gear" is a gear that is generally cylindrical with radially inward-facing teeth (i.e., inner teeth) and radially outward-facing teeth (i.e., outer teeth) and has an axis of rotation that is offset from an axis of rotation of the gears with which it meshes. An annular gear may also be referred to herein as a cluster gear. The annular gear meshes both at its inner teeth and outer teeth with other members of the coplanar gear set or with a member of another gear set.

The coplanar gear set 12 has a first sun gear member 16 rotatable about a first axis of rotation 18. The first sun gear member 16 is mounted on and may be integrally formed with a center shaft 20. The first sun gear member 16 has a radially outward-facing surface 14 defining outer teeth 17.

The coplanar gear set 12 has a second sun gear member 15 with a hub 23 having a central opening 19 that receives the shaft 20 so that the second sun gear member 15 is supported on the shaft 20. The second sun gear member 15 has a radially outward-facing surface 21 that defines outer teeth 27.

The coplanar gear set 12 has a first annular gear 32 that has a radially inward-facing surface 34 with inner teeth 36 and a radially outward-facing surface 38 with outer teeth 40. The coplanar gear set 12 also has a carrier member 42. The carrier member 42 has an inner opening 43 at which it is rotatably supported by the shaft 20. That is, the first carrier member 42 can rotate relative to the shaft 20 and the first sun gear member 16. The carrier member 42 also has a generally cylindrical first hub 44 that is not centered with the first axis of rotation 18. That is, the first hub 44 is an eccentric hub. The first annular gear 32 is supported by the first hub 44 of the carrier member 42 at a first set of cluster bearings 46 so that the first annular gear 32 is rotatable relative to the hub 44. Because the hub 44 is not centered with the first axis of rotation 18, the first annular gear 32 has a second axis of rotation 48 that is offset from the first axis of rotation 18. Specifically, the first annular gear 32 will rotate around the second axis of rotation 48, and as the first annular gear 32 moves the second axis of rotation 48 will rotate around the first axis of rotation 18 in a circle with a radius R1 that is equal to the distance by which the second axis of rotation 48 is offset from the first axis of rotation 18.

Figure 3:
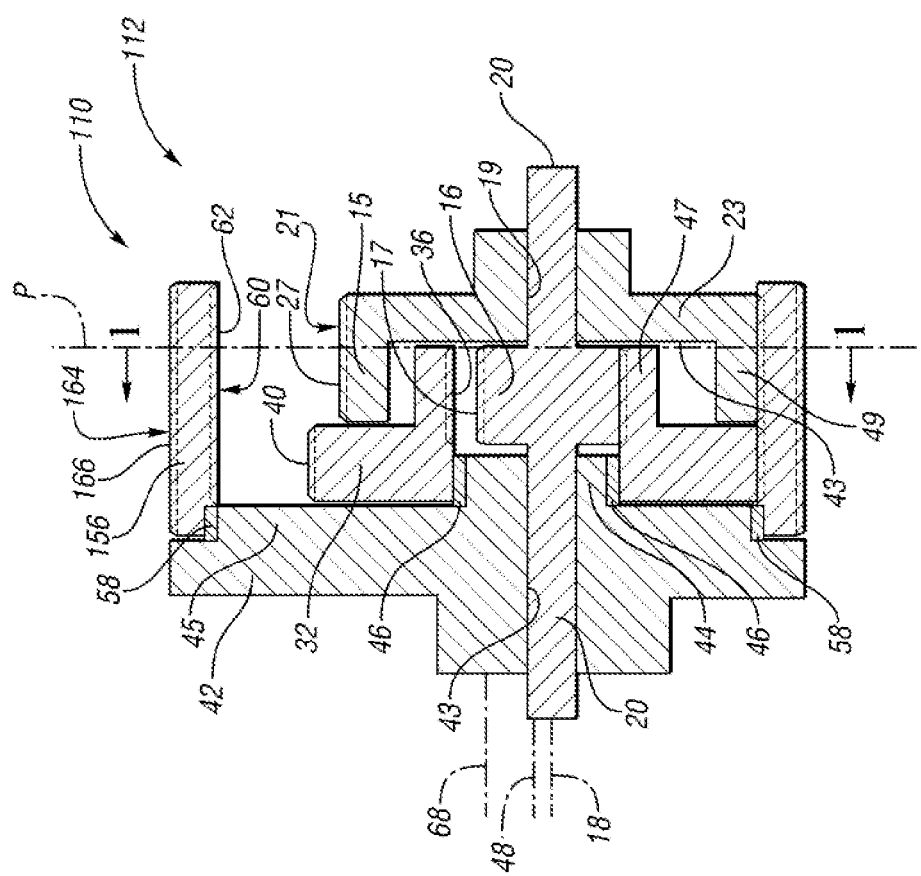
FIG. 3 is a schematic cross-sectional illustration of a portion of a second embodiment of a transmission including a coplanar gear set.

The coplanar gear set 12 has an outer gear 56 that has a radially inward-facing surface 60 with inner teeth 62. In the embodiment shown, the outer gear 56 is a ring gear member because it has inner teeth 62 but no outer teeth. Alternatively, as shown in FIG. 3, an alternative transmission 110 has a coplanar gear set 112 alike in all aspects and functionality as the coplanar gear set 12 except that an outer gear 156 used in place of outer gear 56 is an annular gear because it has both a radially inward-facing surface 60 with inner teeth 62 and a radially outward-facing surface 164 with outer teeth 166.

The carrier member 42 also has a generally cylindrical second hub 45 that is not centered with the first axis of rotation 18. That is, the second hub 45 is an eccentric hub. The outer gear 56 is supported by the second hub 45 of the carrier member 42 at a second set of cluster bearings 58 so that the outer gear 56 is rotatable relative to the second hub 45. As is apparent in FIG. 2, the first hub 44 extends axially from the second hub 45. Both the first annular gear 32 and the outer gear 56 are thus supported by a single, common carrier member 42. Because the second hub 45 is not centered with the first axis of rotation 18 or with the second axis of rotation 48, the outer gear 56 has a third axis of rotation 68 that is offset from the first axis of rotation 18. Specifically, the outer gear 56 will rotate around the third axis of rotation 68, and as the outer gear 56 moves the third axis of rotation 68 will rotate around the first axis of rotation 18 in a circle with a radius R2 that is equal to the distance by which the third axis of rotation 68 is offset from the first axis of rotation 18.

The inner teeth 36 of the first annular gear 32 mesh with the outer teeth 17 of the first sun gear member 16. The outer teeth 40 of the first annular gear 32 mesh with the inner teeth 62 of the outer gear 56. The outer teeth 27 of the second sun gear member 15 also mesh with the inner teeth 62 of the outer gear 56. The hub 23 of the second sun gear member 15 is positioned so that the first sun gear member 16 is positioned axially between the hub 23 of the second sun gear member 15 and the carrier member 42, and the first annular gear 32 is positioned axially between the second sun gear member 15 and the carrier member 42. The second sun gear member 15 has a generally cylindrical recess 43. The first sun gear member 16 and the first annular gear 32 are partially within the recess 43 so that a toothed portion 49 of the second sun gear member 15 radially surrounds the first sun gear member 16 and radially surrounds a portion 47 of the first annular gear 32 having the inner teeth 36.

The second sun gear member 15 is radially surrounded by the outer gear 56, and the first sun gear member 16 is radially surrounded by the first annular gear 32, the second sun gear member 15, and the outer gear 56.

As is apparent in FIG. 2, a radial plane P perpendicular to the first axis of rotation 18 and placed through the coplanar gear set 12 intersects the first sun gear member 16, the first annular gear 32, the second sun gear member 15, and the outer gear 56, so that the meshing of the first sun gear member 16 with the first annular gear 32, meshing of the first annular gear 32 with the outer gear 56, and meshing of the second sun gear member 15 with the outer gear 56 all occur in the single radial plane P.

The coplanar gear set 12 can be used within the transmission 10 along with one or more additional gear sets and various selectively engageable torque-transmitting mechanisms to provide multiple speed ratios in a relatively compact axial space. That is, the axial width occupied by the coplanar gear set 12 is less than the axial width that would be required for two axially-adjacent, simple planetary gear sets that may be necessary to provide the ratio range available with the coplanar gear set 12, potentially reducing weight and increasing fuel economy. Axial space savings, wide gear set ratio range, high contact ratio, and quiet operation can also be achieved.

The speed relationships between the members of the coplanar gear set 12 are as follows:

$$w_{s1}*A = w_{ag}*B + w_c*A;$$

$$w_{s2}*E = w_{og}*D + w_c*E; \text{ and}$$

$$w_{ag}*C = w_{og}*D;$$ where $w_{s1}$ is the rotational speed in revolutions per minute (rpm) of the first sun gear member 16; $w_{s2}$ is the rotational speed in revolutions per minute (rpm) of the second sun gear member 15; $w_{ag}$ is the rotational speed in rpm of the first annular gear 32; $w_{og}$ is the rotational speed in rpm of the outer gear 56, $w_c$ is the rotational speed in rpm of the carrier member 42; A is the number of teeth 17 of the first sun gear member 16; B is the number of inner teeth 36 of the first annular gear 32; C is the number of outer teeth 40 of the first annular gear 32; D is the number of inner teeth 62 of the outer gear 56; and E is the number of outer teeth 27 of the second sun gear member 15. Simplifying the relationship provides: $w_{s1}*A - w_{s2}*E = w_{ag}*(B-C) + w_c*(A-E)$. The same relationships apply to the coplanar gear set 112 of FIG. 3, with $w_{og}$ being the speed in rpm of the annular gear 156 and D being the number of inner teeth 62 of the outer gear 156.

Additional speed ratios can be established by adding either or both of one or more additional gear sets and one or more additional torque-transmitting mechanisms (i.e., clutches or brakes) to the transmission 10 or the transmission 110.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
 a coplanar gear set having:
 a first sun gear member rotatable about a first axis of rotation; wherein the first sun gear member has a radially outward-facing surface defining outer teeth;
 a second sun gear member rotatable about the first axis of rotation; wherein the second sun gear member has a radially outward-facing surface defining outer teeth;
 a carrier member;
 a first annular gear supported by the carrier member and having a radially inward-facing surface defining inner teeth and a radially outward-facing surface defining outer teeth; wherein the first annular gear is rotatable about a second axis of rotation that rotates about the first axis of rotation; wherein the inner teeth of the first annular gear mesh with the outer teeth of the first sun gear member;
 an outer gear supported by the carrier member and having a radially inward-facing surface defining inner teeth; wherein the outer gear is rotatable about a third axis of rotation that rotates about the first axis of rotation; and wherein the inner teeth of the outer gear mesh with the outer teeth of the first annular gear and with the outer teeth of the second sun gear member.

2. The transmission of claim 1, further comprising:
 a first set of cluster bearings positioned between the first annular gear and the carrier member to permit relative rotation thereof; and
 a second set of cluster bearings positioned between the outer gear and the carrier member to permit relative rotation thereof.

3. The transmission of claim 1, further comprising:
 a shaft extending from the first sun gear member; wherein the carrier member has an opening through which the shaft extends and is rotatably supported by the carrier member to establish the first axis of rotation;
 wherein the carrier member has a first eccentric hub supporting the first annular gear to define the second axis of rotation; and wherein the carrier member has a second eccentric hub supporting the outer gear to define the third axis of rotation.

4. The transmission of claim 3, further comprising:
a first set of cluster bearings positioned on the first eccentric hub between the first annular gear and the carrier member to permit relative rotation thereof; and
a second set of cluster bearings positioned on the second eccentric hub between the outer gear and the carrier member to permit relative rotation thereof.

5. The transmission of claim 3, wherein the first eccentric hub extends axially from the second eccentric hub.

6. The transmission of claim 3, wherein the second sun gear member has an opening through which the shaft extends and is rotatably supported by the second sun gear member with the first sun gear member positioned axially between the second sun gear member and the carrier member.

7. The transmission of claim 1, wherein the second sun gear member has a generally cylindrical recess; and wherein the first sun gear member and the first annular gear are at least partially within the generally cylindrical recess so that the second sun gear member at least partially radially surrounds the first sun gear member and the first annular gear.

8. The transmission of claim 1, wherein the outer gear has a radially outward-facing surface that defines outer teeth.

9. A transmission comprising:
a coplanar gear set having:
a first sun gear member rotatable about a first axis of rotation; wherein the first sun gear member has a radially outward-facing surface defining outer teeth;
a second sun gear member rotatable about the first axis of rotation; wherein the second sun gear member has a radially outward-facing surface defining outer teeth;
a carrier member having a first eccentric hub and a second eccentric hub defining a second axis of rotation and a third axis of rotation, respectively;
a first annular gear supported by the carrier member on the first eccentric hub and having a radially inward-facing surface defining inner teeth and a radially outward-facing surface defining outer teeth; wherein the first annular gear is rotatable about the second axis of rotation; wherein the inner teeth of the first annular gear mesh with the outer teeth of the first sun gear member;
an outer gear supported by the carrier member on the second eccentric hub and having a radially inward-facing surface defining inner teeth; wherein the outer gear is rotatable about the third axis of rotation; wherein the inner teeth of the outer gear mesh with the outer teeth of the first annular gear and with the outer teeth of the second sun gear member; and
wherein meshing of the first sun gear member with the first annular gear, meshing of the second sun gear member with the outer gear, and meshing of the first annular gear with the outer gear all occur in a plane that is perpendicular to the first axis of rotation.

10. The transmission of claim 9, further comprising:
a first set of cluster bearings positioned on the first eccentric hub between the first annular gear and the carrier member to permit relative rotation thereof; and
a second set of cluster bearings positioned on the second eccentric hub between the outer gear and the carrier member to permit relative rotation thereof.

11. The transmission of claim 9, further comprising:
a shaft extending from the first sun gear member; wherein the carrier member has an opening in which the shaft is rotatably supported to establish the first axis of rotation.

12. The transmission of claim 11, wherein the second sun gear member has a hub with an opening in which the shaft is rotatably supported so that first sun gear member and the first annular gear are positioned axially between the carrier member and the hub of the second sun gear member.

13. The transmission of claim 9, wherein the outer gear has a radially outward-facing surface that defines outer teeth.

14. The transmission of claim 9, wherein the first eccentric hub extends axially from the second eccentric hub.

15. The transmission of claim 9, wherein the second sun gear member has a generally cylindrical recess; and wherein the first sun gear member and the first annular gear are at least partially within the generally cylindrical recess so that the second sun gear member at least partially radially surrounds the first sun gear member and the first annular gear.

* * * * *